United States Patent
Setzler et al.

(10) Patent No.: US 6,829,082 B2
(45) Date of Patent: *Dec. 7, 2004

(54) ERBIUM DOPED CRYSTAL AMPLIFIER

(75) Inventors: Scott D. Setzler, Manchester, NH (US); Peter A. Ketteridge, Amherst, NH (US); Evan Chicklis, Nashua, NH (US); Peter A. Budni, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/184,668

(22) Filed: Jun. 28, 2002

(65) Prior Publication Data

US 2003/0002136 A1 Jan. 2, 2003

Related U.S. Application Data

(63) Continuation-in-part of application No. 10/348,095, filed on Jan. 21, 2003.
(60) Provisional application No. 60/301,560, filed on Jun. 28, 2003.

(51) Int. Cl.[7] .................................................. H01S 3/00
(52) U.S. Cl. ...................................................... 359/333
(58) Field of Search ........................................ 359/333

(56) References Cited

U.S. PATENT DOCUMENTS

| | | | |
|---|---|---|---|
| 4,723,824 A | 2/1988 | Van de Venne et al. | 350/269 |
| 4,757,268 A * | 7/1988 | Abrams et al. | 359/338 |
| 4,942,119 A | 7/1990 | Ozin et al. | 430/564 |
| 5,038,358 A | 8/1991 | Rand | 372/91 |
| 5,117,437 A | 5/1992 | Rand | 372/69 |
| 5,140,658 A | 8/1992 | Sunshine | 385/49 |
| 5,166,948 A | 11/1992 | Gavrilovic | 372/70 |
| 5,181,211 A | 1/1993 | Burnham et al. | 372/21 |
| 5,200,966 A | 4/1993 | Esterowitz et al. | 372/71 |
| 5,227,913 A * | 7/1993 | McCaughan et al. | 359/333 |
| 5,323,260 A * | 6/1994 | Alfano et al. | 359/244 |
| 5,504,767 A * | 4/1996 | Jamison et al. | 372/41 |
| 5,535,051 A | 7/1996 | Basiev et al. | 359/342 |
| 5,535,232 A | 7/1996 | Bowman et al. | 372/70 |
| 5,557,624 A | 9/1996 | Stultze et al. | 372/92 |
| 5,682,397 A | 10/1997 | Scheps | 372/22 |
| 6,047,013 A | 4/2000 | Payne et al. | 372/41 |
| 6,178,040 B1 * | 1/2001 | Injeyan et al. | 359/346 |
| 6,246,711 B1 | 6/2001 | Stultze et al. | 372/11 |
| 6,288,833 B1 * | 9/2001 | Kasamatsu | 359/333 |
| 6,404,785 B1 | 6/2002 | Scheps | 372/21 |
| 6,459,846 B1 * | 10/2002 | Choi et al. | 385/142 |
| 6,490,081 B1 * | 12/2002 | Feillens et al. | 359/343 |
| 6,529,675 B1 | 3/2003 | Hayden et al. | 385/141 |
| 2001/0043387 A1 * | 11/2001 | Lawrence et al. | 359/333 |
| 2002/0048289 A1 * | 4/2002 | Atanackovic et al. | 372/20 |
| 2002/0150331 A1 * | 10/2002 | Tomlinson et al. | 385/27 |
| 2002/0186455 A1 * | 12/2002 | Ketteridge et al. | 359/333 |
| 2002/0186734 A1 * | 12/2002 | Setzler et al. | 372/39 |

* cited by examiner

*Primary Examiner*—Nelson Moskowitz
*Assistant Examiner*—Deandra M. Hughes
(74) *Attorney, Agent, or Firm*—Paul C. Remus; Michelle Saquet Temple; Devine, Millimet & Branch, P.A.

(57) ABSTRACT

The present invention is an amplifier for amplifying an optic signal. The amplifier includes a signal source transmitting the signal, which includes a signal portion in the L-band. The signal first passes into a first signal manipulator. The first signal manipulator is one or more collimators and/or concentrators and, in some embodiments, can include dichroics or optical manipulators known to those skilled in the art. An input pump is aligned to overlap the signal with pump light. From the first signal manipulator, the signal and the pump light intersects the erbium doped crystal, wherein the pump light excites the crystal and the signal impinges the crystal, amplifying the signal.

13 Claims, 3 Drawing Sheets

ERBIUM DOPED CRYSTAL AMPLIFIER

The present application claims priority from provisional application Ser. No. 60/301,560, which was filed on Jun. 28, 2001 continuation-in-part of U.S. Pat. No. 10/348,095 filed Jan. 21, 2003.

FIELD OF THE INVENTION

The present invention is in the field of optical amplifiers. More specifically, the present invention is intended to be an alternative for erbium doped fiber amplifiers ("EDFA") and used in applications similar to EDFAs.

BACKGROUND OF THE INVENTION

Optical amplifiers are commonly used in optical networks and, in fact, required for most optical networks. Optical networks use silica-based fibers for transmission of optical signals. Optical networks carry multiple signals from point to point simultaneously through the use of different channels, wherein each channel represents a distinct wavelength. The limit on the number of signal transmitted through the fiber is limited by the number of available channels. The number of available channels is limited by many factors, including how closely spaced can the channels be before neighboring channels overlap and interfere with each other. Another concern, from a temporal standpoint, is how frequently can digital signals be generated and accurately detected at any given time.

These limitations can be alleviated by making use of previously unavailable wavebands (bands of wavelengths). The C-band is the center of the optical transmission window and is typically the only band efficiently used in optical networks. Ideally, an optical network would make use of the S-band, conventionally described as 1.48 to 1.52 microns, and the L-band, conventionally described as 1.57 to 1.605 microns, which appear on either side of the C-band. EDFAs do not operate in the S-band and are very inefficient in the L-band.

EDFAs exhibit peak gain coefficients between 1.53 and 1.57 microns of between 1 dB/m and 1.5 dB/m. In the L-band, which is over 1.57 microns, gain coefficients for EDFAs are 5 times below the peak, experienced in the C-band. To compensate for the reduced gain coefficient in the longer waveband, the length of the fiber must be increased five-fold. The longer fiber length in the L-band for EDFAs introduces more passive fiber loss and decreases overall conversion efficiency. The loss can only be overcome by increasing the diode pump power.

SUMMARY OF THE INVENTION

The present invention is the result of the realization that Erbium doped crystals can provide amplification over a broader wavelength range, more efficiently than Erbium doped fiber. More specifically, Erbium doped crystal amplifiers are far more efficient for amplifying signals in the L-band than EDFAs.

Therefore, an object of this invention is to efficiently amplify optic signals in the L-band.

BRIEF DESCRIPTION OF THE DRAWINGS

These and other features and advantages of the present invention will be better understood by reading the following detailed description, taken together with the drawings wherein.

DETAILED DESCRIPTION OF THE INVENTION

Figure 1:
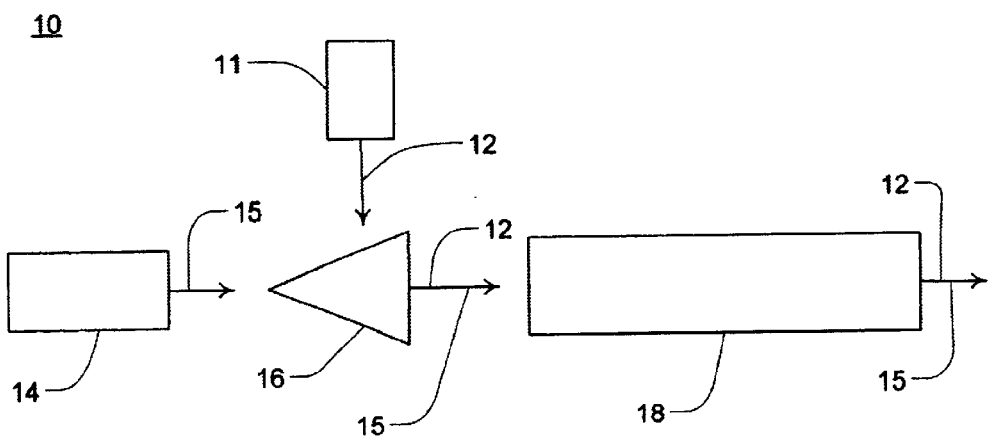
FIG. 1 is a three-dimensional view of an Erbium doped crystal amplifier.
Figure 2:
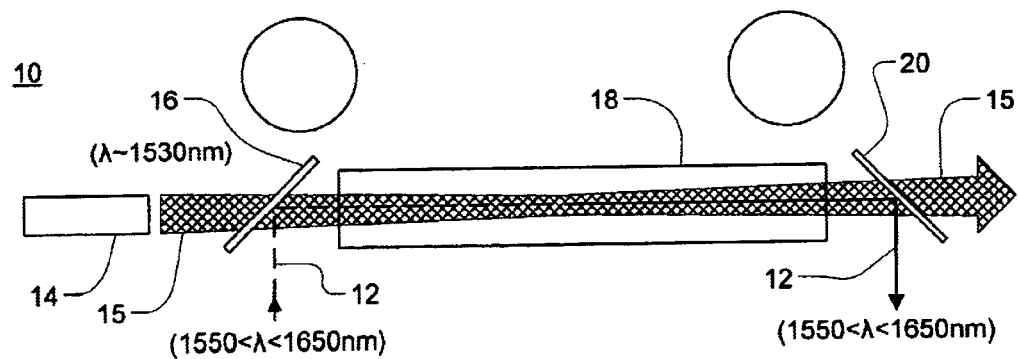
FIG. 2 is a pump schematic of an Erbium doped crystal amplifier/oscillator.

The present invention is an amplifier 10 for amplifying an optic signal 12. The amplifier 10 includes a signal source 11 transmitting the signal 12, which includes a signal portion in the L-band. The signal 12 first passes into a first signal manipulator 16. The first signal manipulator 16 is one or more collimators and/or concentrators and, in some embodiments, can include dichroics or optical manipulators known to those skilled in the art. An input pump 14 is aligned to overlap the signal 12 with pump light 15. From the first signal manipulator 16, the signal 12 and the pump light 15 intersects the Erbium doped crystal 18, wherein the pump light 15 excites the crystal 18 and the signal 12 impinges the crystal 18, amplifying the signal 12.

In a preferred embodiment, the signal 12 passes through a second optical manipulator 20, which is also at least one or more collimators and/or concentrators.

A narrower embodiment of the invention would include making the input pump 14 one or more laser diode side pumps. Alternatively, another embodiment of the invention would involve making the input pump a back pump. Another narrower embodiment would involve the manipulators having one or more dichroics.

Figures 3A, 3B:
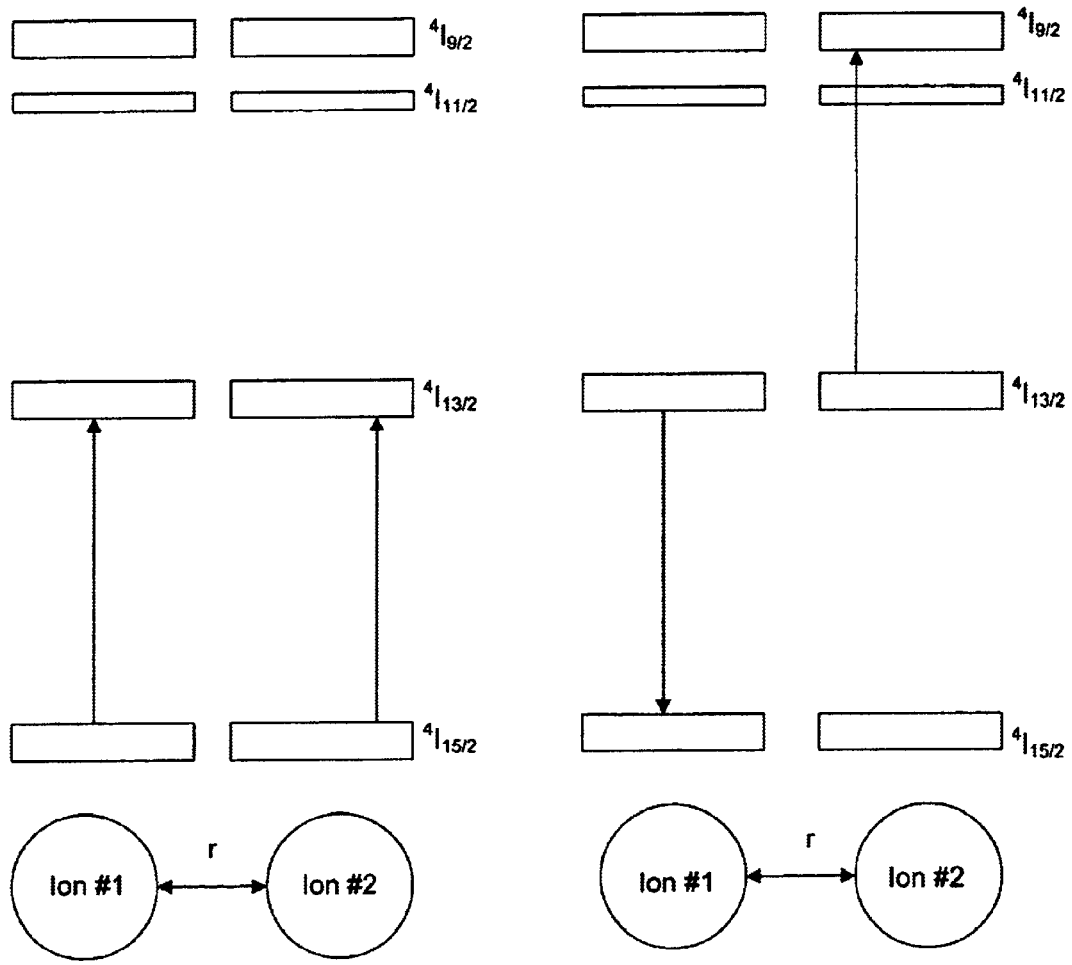
FIG. 3 depicts the parasitic upconversion process in erbium.

FIG. 3 depicts the parasitic upconversion process in erbium. The energy levels of two ions are depicted. Both ions are in the excited state and are separated by distance r. Ideally, the energy from each ion would be extracted optically as a photon, amplifying a signal. In many cases, however, electric dipole and multipole interactions between the ions will result in a transfer of energy between the ions. Ion#1 returns to the ground state without emitting a photon, and the released energy is used to excite ion#2 to a higher-lying state. One factor in the upconversion process is that the energy required to reach the latter state is nearly equal to the energy released. Therefore, the ion released energy will be used for the application of the device (i.e. amplify a signal), unless the ion released energy is first used for upconversion of a proximate ion.

The lack of ordered structure in glass hosts (i.e., fibers) makes it difficult to maintain large dopant ion spacings (r) even at low to moderate doping levels of 0.1% Er. Conventional crystalline hosts significantly alleviate this problem, as there are well defined sites in the crystal lattice for the dopant ions to reside. Upconversion does not become problematic in crystalline hosts until dopant levels of 1–2% Er are exceeded. As reported by Ibanez et al., [J. Solid State Chem. 53, 406–414 (1984)], the lattice structure of $CaGa_2S_4$ forces dopant ions further apart, allowing higher dopant concentrations. In this fashion, the upconversion interaction in erbium is reduced by the increased separation in $CaGa_2S_4$.

Erbium-doped $CaGa_2S_4$ (Er: $CaGa_2S_4$) suffers minimal parasitic upconversion. The minimized upconversion allows higher erbium concentrations and, in turn, shorter gain lengths. In principle, a 1-cm long Er: $CaGa_2S_4$ crystal can exhibit optical gains as high or higher than a several-meter long erbium doped fiber typically used in EDFAs. The new crystal can reduce the cost, size and complexity of current optical amplifier systems.

Crystalline erbium hosts, such as yttrium aluminum garnet ($Y_3Al_5O_{12}$), yttrium lithium fluoride ($YLiF_4$) and calcium gallium sulphide ($CaGa_2S_4$), have several properties making them suitable hosts for erbium ion emission ~1.6 microns. The first excited state ($^4I_{13/2}$) to ground state ($^4I_{15/2}$) transition in trivalent erbium ($Er^{3+}$) results in photon emission around 1.6 um (~1.50–1.70 um), and is uniquely host dependent. Population of the first excited state can be achieved by directly pumping (or exciting) ions from the $^4I_{15/2}$ state to the $^4I_{13/2}$ state. This process is known a resonant pumping and typically requires a pump source ~1.45–1.55 um, such as a laser diode or an erbium glass laser. Alternatively, higher lying states may be directly pumped, such as the $^4I_{11/2}$ state, which typically requires a pump source ~980 nm. After exciting the $^4I_{11/2}$ state, one must rely on relaxation (energy transfer from the ion in the higher lying state) of the excited ion to the $^4I_{13/2}$ state (either by photon or phonon emission). A desensitizing ion, such as trivalent cerium or europium, can be used to increase the energy transfer rate. This ion carries away the energy difference between the higher lying state (e.g., $^4I_{11/2}$) and the desired first excited state ($^4I_{13/2}$).

Figure 4:
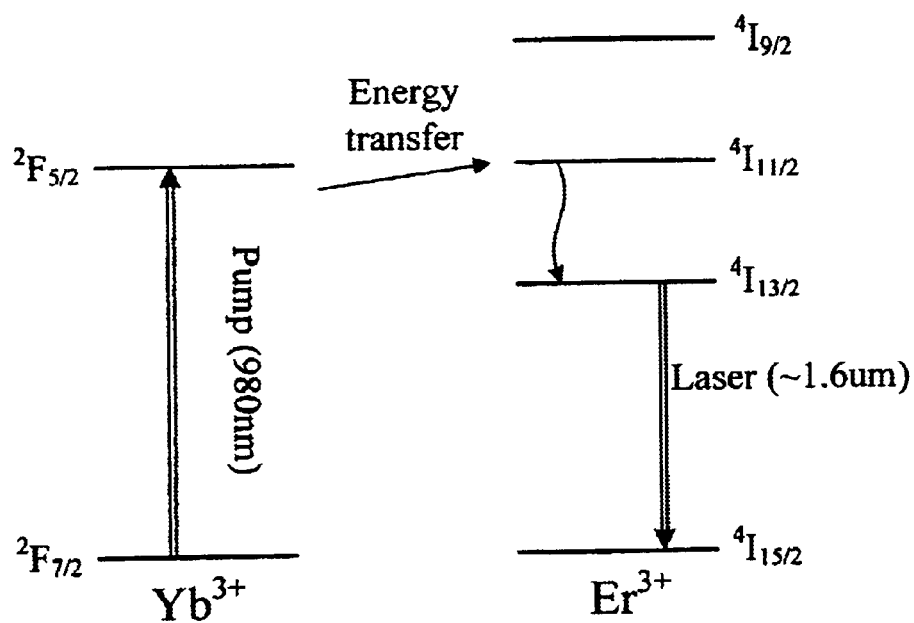
FIG. 4 depicts Ytterbium used as a sensitized ion for exciting Erbium ions through energy transfer.

Finally, a sensitizer ion may be used, wherein the pump light is absorbed by the sensitizer ions and transferred to the erbium ions (known as the activator ions). An example is the common use of ytterbium as a sensitizer in glass and fiber-based erbium lasers. As shown in FIG. 4, the ytterbium ions absorb pump light ~980 nm, and transfer their energy to the $^4I_{11/2}$ state of erbium. Again, a relaxation mechanism is required to bring the ions into the $^4I_{13/2}$ state.

Trivalent erbium is normally highly susceptible to parasitic upconversion, wherein a special host is required to impede the upconversion process. The upconversion process is host dependent, as the ion spacing, or separation, plays a major role in the ability of excited ions to interact. The lattice parameters of calcium gallium sulphide, however, are such that here is little cross-talk between neighboring excited ions, hence upconversion is minimized.

We claim:

1. An amplifier for amplifying an optic signal, said amplifier comprising:
    a signal source transmitting the signal, wherein the signal contains a signal portion with wavelengths between about 1.55 and about 1.65 microns;
    a first optical manipulator aligned with the signal, said first manipulator consisting of at least one of the group of at least one collimator and at least one concentrator;
    an input pump aligned to overlap the signal with a pump light;
    at least one crystalline host, doped with erbium ions, placed to be excited by the pump light and impinged by the signal after the first manipulator whereby the energy level of at least the signal portion is amplified by the host; and
    wherein the host is selected from a group consisting of:
    calcium gallium sulphide;
    yttrium aluminum garnet; and
    yttrium lithium fluoride.

2. The amplifier of claim 1 further comprising a second optical manipulator aligned to receive the signal from the host, said second manipulator consisting of at least one of the group of at least one collimator and at least one concentrator.

3. The amplifier of claim 1 wherein the input pump comprises at least one laser diode side pump.

4. The amplifier of claim 1 wherein the input pump comprises at least one laser diode end pump.

5. The amplifier of claim 1 wherein the manipulator further comprises at least one dichroic.

6. The amplifier of claim 1 further comprising an optical resonator containing the excited host.

7. The amplifier of claim 6 wherein the resonator is capable of producing a multi-wavelength output.

8. The amplifier of claim 1 wherein the pump light is between 1.45 and 1.55 microns in wavelength.

9. The amplifier of claim 1 wherein the erbium ions are excited above a first excited state.

10. The amplifier of claim 9 further comprising a desensitizing agent wherein the agent transfers energy from the erbium ions thereby reducing erbium ion excitation down to the first excited state.

11. The amplifier of claim 1 further comprising a sensitizer ion wherein the sensitizer ion amplifies the pump light's excitation of the erbium doped crystalline host.

12. A method for amplifying an optic signal, said method comprising:
    transmitting a signal, wherein the signal contains a signal portion with wavelengths between about 1.55 and about 1.65 microns;
    aligning a first optical manipulator with the signal, said first manipulator consisting of at least one of the group of at least one collimator and at least one concentrator;
    firing a pump light to overlap the signal; and
    aligning at least one calcium gallium sulphide host crystal, doped with erbium ions, to be excited by the pump light and impinged by the signal after the first manipulator whereby the energy level of at least the signal portion is amplified.

13. The method of claim 12 wherein the pump light is between 1.45 and 1.55 microns in wavelength.

* * * * *